June 1, 1954  DEVENDRA NATH SHARMA  2,679,725
EXHAUST EFFUSION TURBINE JET PROPULSION POWER UNIT
Filed July 15, 1949  7 Sheets-Sheet 7

INVENTOR.
Devendra Nath Sharma,
BY
John B. Brady
ATTORNEY

Patented June 1, 1954

2,679,725

UNITED STATES PATENT OFFICE 2,679,725

EXHAUST EFFUSION TURBINE JET PROPULSION POWER UNIT

Devendra Nath Sharma, London, England

Application July 15, 1949, Serial No. 104,933

3 Claims. (Cl. 60—35.6)

My invention relates broadly to exhaust effusion turbine jet propulsion power units and more particularly to an improved construction of compressed gas-driven turbine and high pressure gaseous jet propulsion.

One of the objects of my invention is to provide a construction of gaseous jet propulsion unit for aircraft, land vehicles, watercraft, etc., in which a very high degree of compression and jet propulsion is secured while operating the generator at high thermal efficiency.

Still another object of my invention is to provide a compact construction of gaseous generator and jet propulsion means in which a pressure-driven turbine is arranged concentrically around the jet for driving gases at high compression through the jet in the development of propulsion forces.

Still another object of my invention is to provide means in a high compression propulsion jet system for readily regulating and controlling the jet pressure.

A still further object of my invention is to provide an arrangement of stator and rotor system of a gaseous turbine in association with gaseous feed means and combustion means for developing a high compression propulsion jet pressure.

Other and further objects of my invention reside in the construction of high compression jet propulsion mechanism as set forth more fully in the specification hereinafter following by reference to the accompanying drawing, in which:

Fig. 13 is a longitudinal sectional view showing the application of the system of my invention to a multi-stage turbine with internally and externally arranged blades supported on the same hollow shaft or cylinder bearing the rotary members of the coaxial compressor and also the formation of internally disposed burners, heat-deflecting baffle plates, and illustrating the contour of the central cylindrical chamber of the device to the torque generator.

My invention is directed to a system of heat generating jet associated with a coaxial compressor unit of compact construction whereby onrushing cold air collected by the unit in transit is simultaneously heated and compressed from atmospheric pressure. The compressed heated air is then mixed in a surrounding peripheral chamber and utilized to drive a coaxial turbine. The issuing hot gases are then utilized for jet propulsion providing a high pressure thrust for forward movement. Various arrangements of multi-stage turbines associated with pressure feed means for atmospheric air and control and regulating means for the thrust jet are provided in the several forms of my invention illustrated herein.

Figure 1:
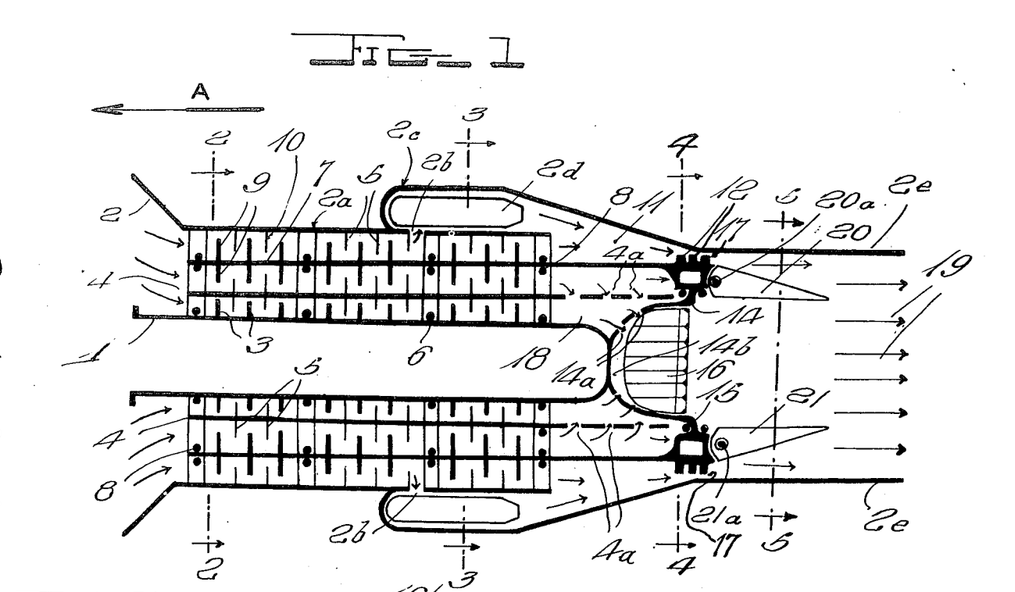
Figure 1 is a longitudinal diagrammatical sectional view taken through a jet system according to my invention.
Figure 2:
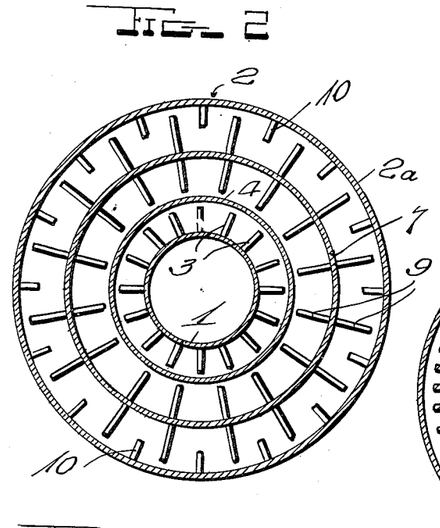
Fig. 2 is a transverse sectional view taken substantially on line 2—2 of Fig. 1.
Figure 3:
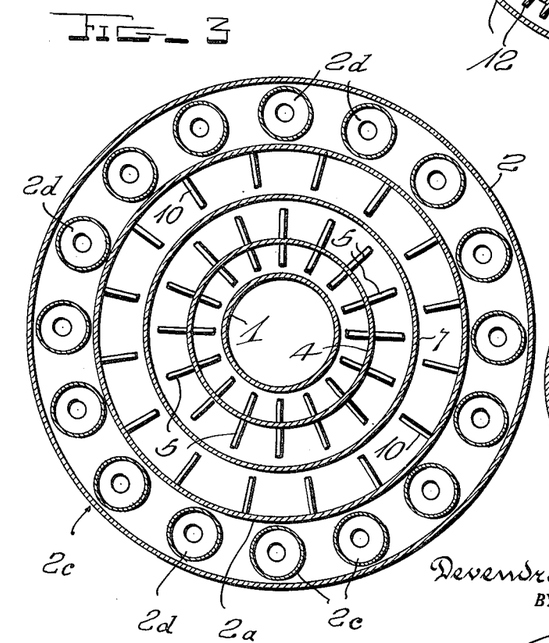
Fig. 3 is a transverse sectional view taken substantially on line 3—3 of Fig. 1.
Figure 4:
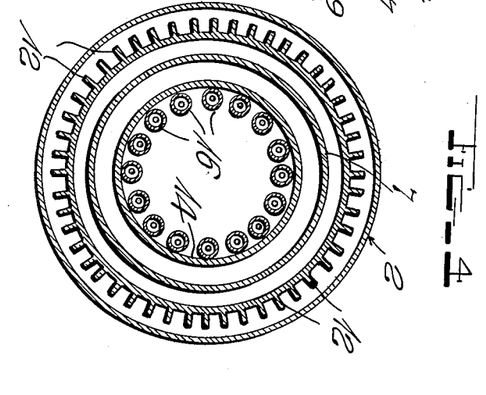
Fig. 4 is a transverse sectional view taken substantially on line 4—4 of Fig. 1.

Referring to the drawings in detail, reference character 1 represents a hollow rotary shaft which may be connected through a reduction gearing 32 to a compression feed propeller 31 for delivering air under pressure to the device as the device moves in the direction of arrow "A." The cold air at atmospheric pressure is collected by the tunnel-like outer casing 2 and delivered to the sets of rotary blades 3 carried by rotating cylindrical shaft 1 operating with respect to the cylindrical stator 4 carrying the sets of alternately disposed stator blades 5. The cylindrical shaft 1 is mounted for high speed rotary movement on spaced bearings represented generally at 6. The stator 4 is disposed intermediate the rotary shaft 1 and the second concentrically arranged rotary cylindrical shaft 7 which is supported in sets of spaced bearings, represented schematically at 8. The cylindrical shaft 7 carries sets of alternately disposed rotor blades 9 which coact with the sets of stator blades 5 hereinbefore described. The cylindrical portion 2a of casing 2 is provided with inwardly directed stator blades 10 disposed alternately with respect to the rotor blades 9 whereby the several sets of stator and rotor blades constitute tiers of air compressors. The casing 2a is perforated in an annular path as represented at 2b for delivering air under compression to the multiple burner casing 2c. The multiple burner casing 2c forms a housing for a multiplicity of spacially disposed burners 2d by which the compressed air is heated and delivered under compression to the annular chamber 11 and to the sets of multiple turbine blades 12 carried by rotor 7 and the extension 14 of the rotary shaft 1. The multiple turbine blades 12 are mounted for rotary movement on suitable bearings 15 for high speed rotary operation.

The stator cylinder 4 is perforated in annular positions at 4a intermediate the rear end thereof and the mounting for the multiple turbine blades 12, and likewise the rearwardly extending support 14 for the multiple turbine blades 12, is perforated as represented at 14a for the passage of compressed air from the sections of the air compressor to the sets of multiple burners 16 mounted in the rear of the end of the hollow shaft 1 in the chamber designated at 14b. That is to say, air and fuel under compression and intense heat is delivered from chamber 11 to the multiple turbine blades 12 while constituting compressor No. 1; while air and fuel under compression is delivered from annular chamber 17 constituting compressor No. 2; and air and fuel under compression is delivered from annular chamber 18 to the rear chamber 14b constituting compressor No. 3. All of the three stages of compressed air and combustible products are integrated for production of the jet pressure released at 19. This jet pressure is controlled by streamline regulating vanes represented at 20 and 21 pivotally mounted with respect to the cylindrical portion 2e of the outside casing as represented at 20a and 21a. Thus the hot compressed air is delivered at high velocity and readily controlled for producing the jet pressure.

Figure 5:
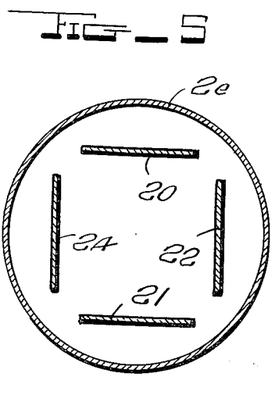
Fig. 5 is a transverse sectional view taken substantially on line 5—5 of Fig. 1.

Figs. 2–5 are transverse pivotal views taken substantially on correspondingly numbered lines of Fig. 1 and illustrate the concentrical relation of the multiple turbine sections and heaters. Fig. 5 shows particularly the manner of mounting the regulating vanes 20 and 21 and their coacting regulating vanes 22 and 24 which are arranged in diametrically opposite positions and substantially chordal with respect to the casing 2e.

Figure 6:
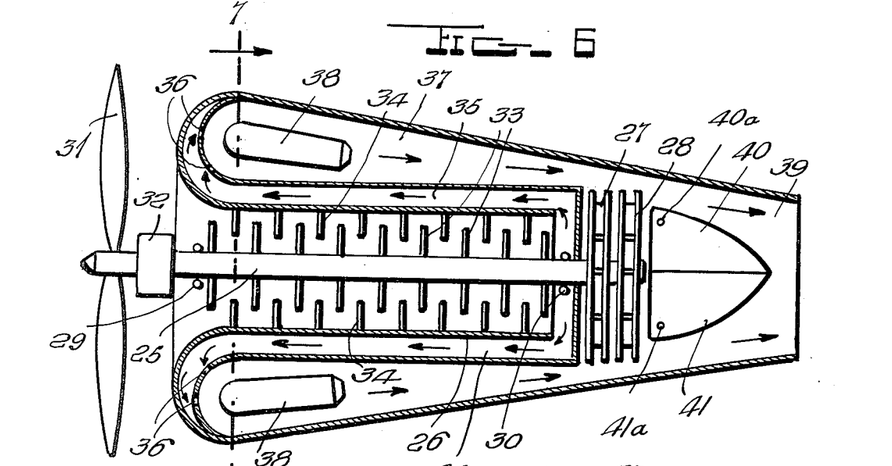
Fig. 6 is a schematic longitudinal sectional view through one of the simplest applications of the internal combustion gas turbine construction of my invention utilizing a single solid shaft.

I have shown in Fig. 6 one of the simplest forms of internal combustion gas turbine construction utilizing my invention in which a single solid shaft 25 is mounted within the turbine stator 26 and carries multiple stage turbine rotors 27 and 28. Shaft 25 is journaled within the casing formed by stator 27 in suitable bearings 29 and 30. A propeller 31 connects to shaft 25 through reduction gearing 32. Shaft 25 carries rotor blades 33 which coact with alternately disposed stator blades 34 carried by stator 26. Air collected by the forward thrust of stator 26 and the action of propeller 31 is forced to travel in the return flow duct 35 in an annular path and through apertures 36 into a plurality of individual combustion chambers which I have represented at 37 each of which contains a burner 38. The compressed and heated gases are forced through chambers 37 and are delivered through the blades of the multi-stage turbines 27 and 28 driving the shaft 25. The hot gases are discharged in a jet through opening 39. The velocity of the jet is controllable by angularly adjustable blade members represented at 40 and 41, pivotally mounted at 40a and 41a.

Figures 7, 8:
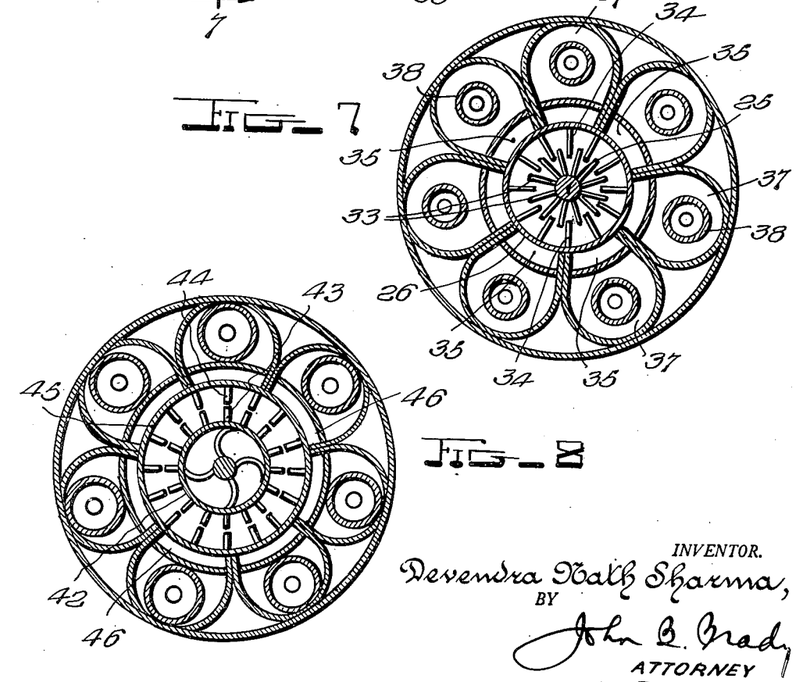
Fig. 7 is a transverse sectional view taken substantially on line 7—7 of Fig. 6.
Fig. 8 is a modified arrangement of the structures of Figs. 6 and 7 where the solid shaft has been modified into a hollow shaft to enable better cooling of various parts and where used as a straight through hollow cylinder assists in producing a ram jet effect.

The cross-sectional view in Fig. 7 shows the arrangement of the plurality of burners.

In Fig. 8 I have shown a modified arrangement of turbine construction in which a hollow shaft 42 is provided to enable better cooling of the various parts and serving as a straight through hollow cylinder for producing a ram jet effect. The rotor shaft 42 is shown as having blades 43 thereon coacting with blades 44 carried by stator 45. A return flow duct 46 directs the hot gases into the individual combustion chambers containing burners 38.

Figure 9:
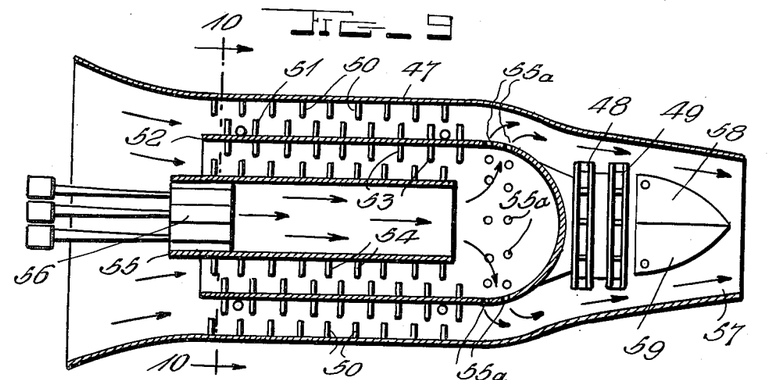
Fig. 9 schematically shows in longitudinal section a further modified form of jet propulsion device embodying my invention in which a hollow cylindrical central portion is provided, forming the rotary portion of the coaxial compressor and serving to support the multi-stage turbine blades.
Figure 10:
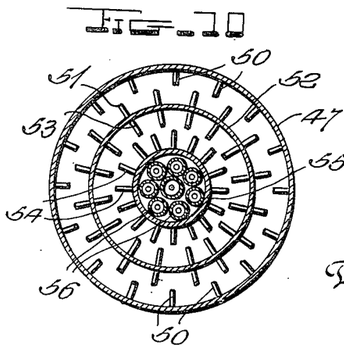
Fig. 10 is a transverse sectional view taken substantially on line 10—10 of Fig. 9.

In Fig. 9 I have shown a further modified form of construction in which the hollow cylindrical stator 47 surrounds the multi-stage turbine formed by sets of blades 48 and 49. The stator 47 includes inwardly directed turbine blades 50 which coact with alternately disposed turbine blades 51 carried by rotor 52. Rotor 52 includes inwardly directed turbine blades 53 which coact with sets of stator blades 54 carried by the stator cylinder 55. Stator cylinder 55 forms a cavity housing burners 56, the hot gases from which flow through apertures 55a in the rotor 52 and coact with the air flow between the stator and rotor blades and driving the turbine blades 48—49. The propulsion jet is discharged from the rear 57 of the stator casing 47 under control of the angularly adjustable vanes 58—59. The coaction of the several elements in the structure illustrated in Fig. 9 are shown more clearly in the cross-sectional view illustrated in Fig. 10.

Figure 11:
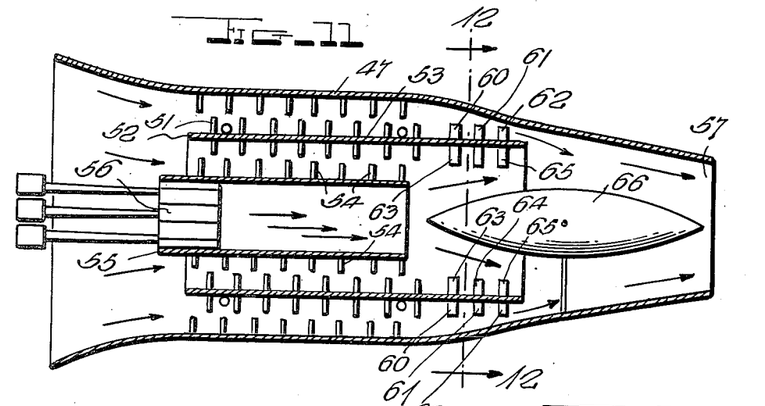
Fig. 11 is a fragmentary longitudinal cross-sectional view showing a further modified arrangement of turbine blades situated internally instead of externally of the rotary hollow cylinder.

In Fig. 11 I have shown a further modification of the structure of my invention in which the turbine blades extend both internally and externally of the rotor 52. In this arrangement the multi-stage turbine comprises the outwardly extending sets of blades 60, 61 and 62, and also the inwardly extending sets of blades 63, 64 and 65 with a central baffle 66 so arranged that the hot gases from the burners coupled with the onrushing compressed air coact on the turbine blades for rotatably driving the turbine and discharging in a jet through the exhaust opening 57.

Figure 12:
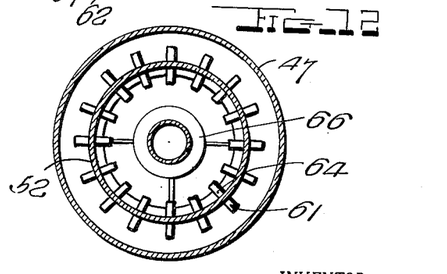
Fig. 12 is a fragmentary transverse sectional view taken substantially on line 12—12 of Fig. 11.

In Fig. 12 the relationship of the inwardly and outwardly projecting turbine blades will be clear.

In Fig. 13 I have shown an arrangement of multi-stage turbine with internally and/or externally disposed blades 67 and 68 supported on the same hollow shaft or tube 69 which carries the rotor blades 70 and 71. In this arrangement the hollow shaft or tube 69 is mounted for rotative movement on bearings schematically illustrated at 72 supported in the stator turbine 73. Stator turbine 73 is provided with inwardly directed stator blades 74 which coact with the rotor blades 70. The stator turbine 73 is outwardly flared as represented at 73a for picking up the onrushing cold air and directing the same through the sets of rotor and stator blades and through the burners represented at 75. Burners 75 direct heat through the central tube 76 provided with heat deflecting baffle plates 77 which conduct heat into the stator blades 78 coacting with the inwardly directed rotor blades 71. The central cylindrical chamber or tube 76 is shaped as represented in Fig. 13 to provide perforations for the flow of gases at 79 and to provide a restricted venturi connection at 80 to the hollow chamber 81 disposed centrally within the inwardly directed turbine blades 67. The hollow chamber 81 supplies a housing for additional burners 82 which assist in the initial take-off or during special climbing in high speed altitude operations. The rotor cylinder 69 is perforated at 69a for the passage of hot gases in the driving of the turbine. Part of the cool air is utilized from the outermost coaxial compressor to cool the turbine blade structure and assist in rotating the turbine blade assembly.

Figure 14:
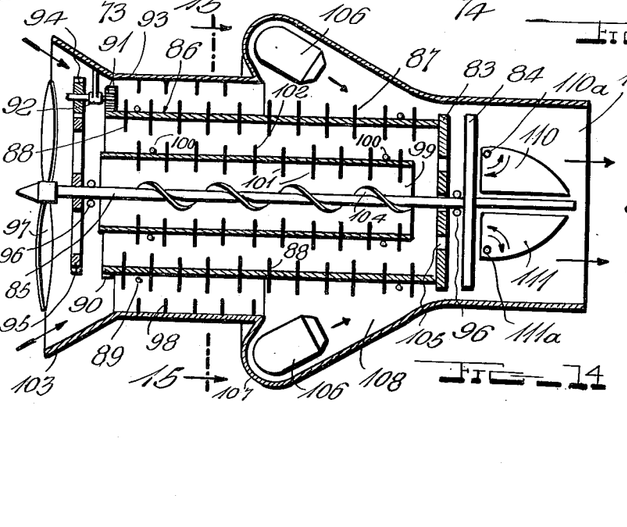
Fig. 14 illustrates a further modified form of internal combustion gas turbine employing cylindrical supporting surfaces for coaxial stator or rotor blades, constituting multiple coaxial compressors.
Figure 15:
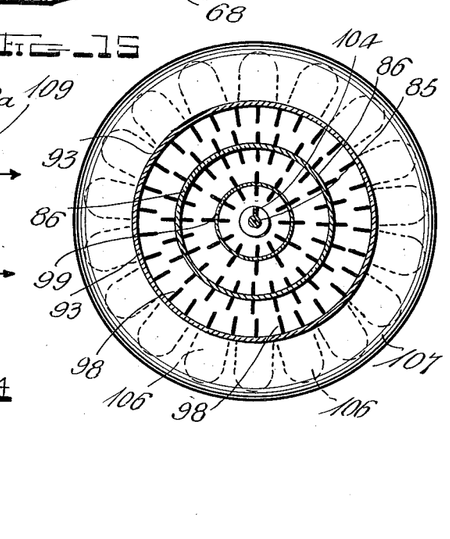
Fig. 15 is a transverse sectional view taken substantially on line 15—15 of Fig. 14.

In Figs. 14 and 15 I have shown a further modified form of internal combustion gas turbine construction in which cylindrical supporting surfaces are utilized for the coaxial stator and rotor blades to form several tiers of coaxial compressors. Two independently rotatable turbine rotors 83 and 84 are provided, the turbine rotor 84 being mounted on central rotatable shaft 85 and the independently rotating turbine rotor 83 being mounted on rotatable cylinder 86. The rotatable cylinder 86 carries outwardly extending rotor blades 87 and inwardly directed rotary blades 88, the cylinder 86 being journalled on bearings 89 for rotation. The cylinder 86 carries a circular rack 90 which meshes with pinion 91 journalled at 92 with respect to stator housing 93. Pinion 91 is connected with pinion 94 which in turn meshes with gear 95 carried by shaft 85. Shaft 85 is journalled in bearings 96 and carries propeller 97. Propeller 97 is thus driven and feeds air into stator housing 93. Stator housing 93 carries sets of inwardly directed blades 98 alternately disposed with respect to blades 87 projecting from cylinder 86.

An independent rotor is provided in the arrangement of Figs. 14 and 15 as represented at 99, rotatably journalled on bearings 100. The independent rotor 99 carries inwardly directed blades 101 and outwardly extending blades 102. Blades 102 are alternately disposed with respect to blades 88 of rotor 86. Rotor 99 may also be geared to another propeller, not shown, or may be driven by the inrushing air which follows into the inlet shown at 103. In order to further agitate, break up and feed the air, I provide a spiral vane 104 on shaft 85. The onrushing air under pressure is fed through apertures 105 for driving turbine blades 84 and is fed between blades 87 and 98 to burners 106 housed within annular extension 107 on stator housing 93 for driving turbine blades 83 and 84. Burners 106 are directed inwardly at an angle igniting gases in the combustion chamber 108 and heating the rotors and assisting in the forcing of the compressed air past the turbine blades 83 and 84 to the discharge jet orifice 109. The velocity of the jet is controlled by regulating vanes 110 and 111 pivoted at 110a and 111a in the stator housing 93. It will be seen that in this arrangement very thorough mixing of the hot compressed gases is obtained with the aid of air collected in the atmosphere while the unit is in transit through the air for simultaneously heating, compressing and igniting the mixture for generating the driving forces and developing the jet pressure at the rear of the unit.

It will be understood that in all of the arrangements of the propulsion unit described herein that liquid or gaseous fuel is supplied to the burners from a reservoir external to the unit and through conduits which extend through the stator casing to the several burners. Furthermore, these arrangements can be easily adaptable to sources of heat generation from atomic fission sources or methods.

Figures 16, 21:
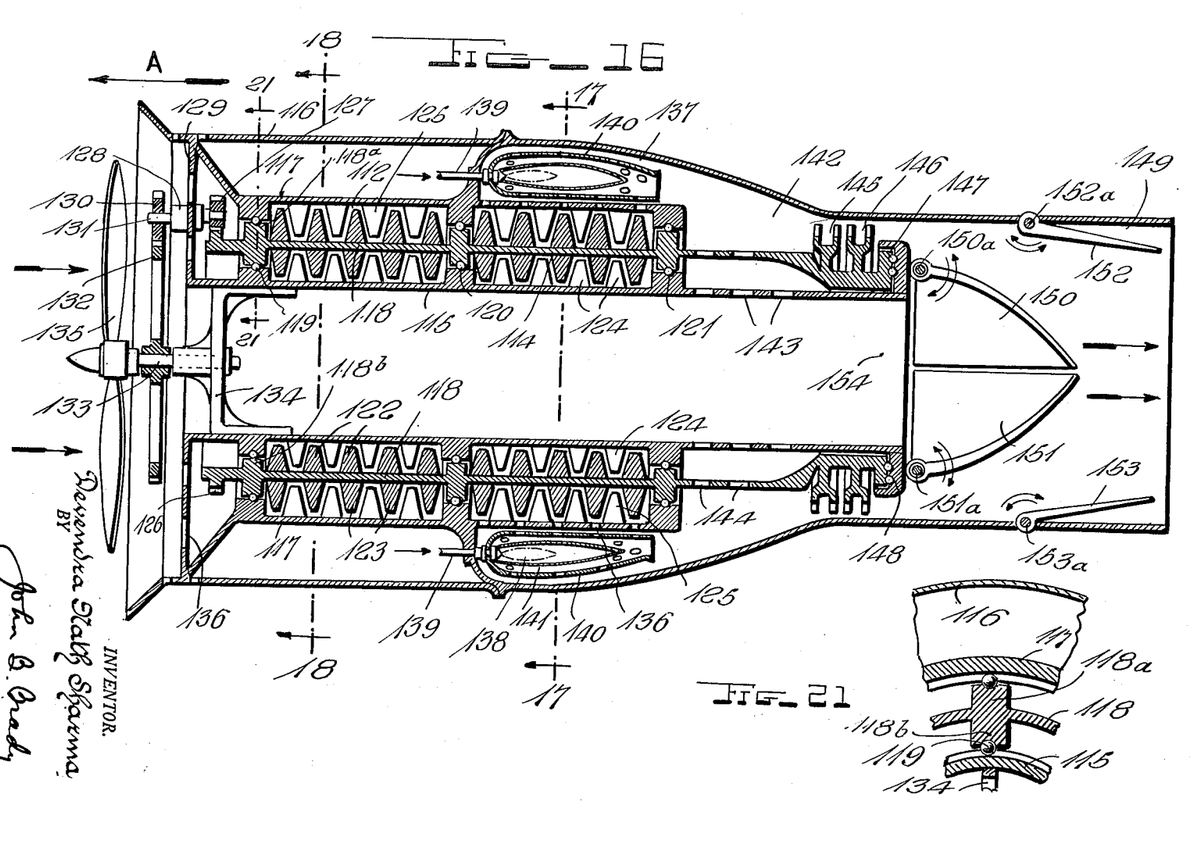
Fig. 16 is a vertical longitudinal sectional view of a multiple tier-type of coaxial compressor embodying my invention and taken substantially on line 16—16 of Fig. 17.
Fig. 21 is a detailed fragmentary view showing the manner of spacially journalling the rotor and stator elements of my invention of the type shown, for example, in Figs. 16–18 to provide for adequate space between the rotor and stator elements for directing the onrushing air collected by the unit in transit and reducing to a minimum any blocking effect thereof which might be caused by mounting means between the cylinders supporting the rotor and stator elements.
Figure 17:
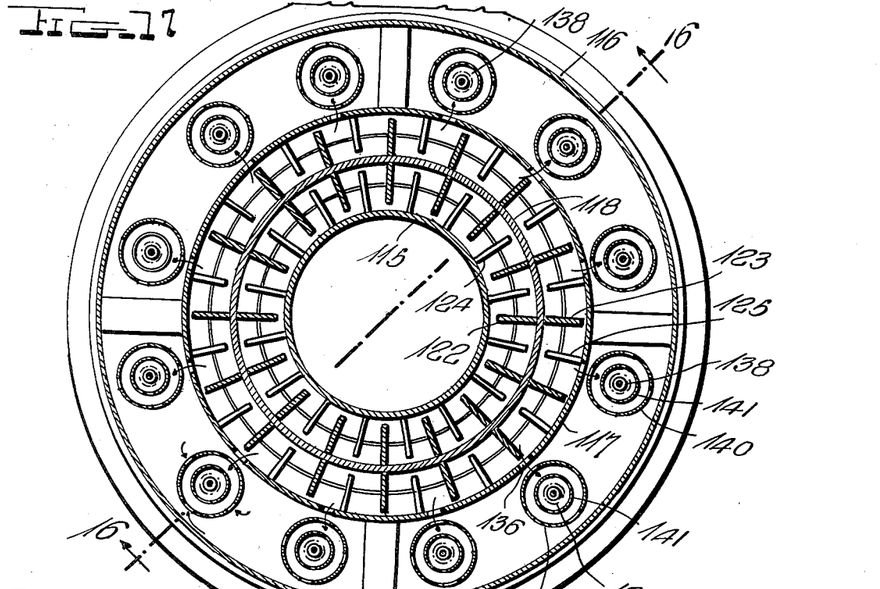
Fig. 17 is a transverse sectional view taken substantially on line 17—17 of Fig. 16.
Figure 18:
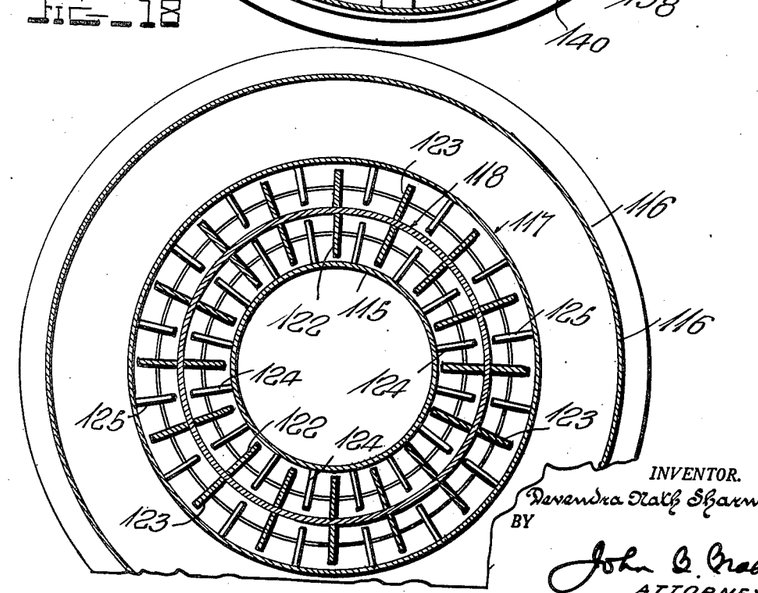
Fig. 18 is a transverse sectional view taken substantially on line 18—18 of Fig. 16.

In Figs. 16, 17 and 18 I have illustrated a further application of my invention to a construction of two-tier type of coaxial compressor where one tier is represented at 112 and the other tier is represented at 114 concentrically arranged about the central feed tube designated at 115 axially disposed with respect to external stator casing 116. The external stator casing 116 is provided with an internal cylindrical wall structure 117 spaced from the central feed tube 115 and between which the rotary cylinder 118 operates on anti-friction bearings shown at 119, 120 and 121. The rotary cylinder 118 carries inwardly directed blades 122 and outwardly extending blades 123 which coact with sets of stator blades, one set of which is designated at 124 projecting outwardly from feed tube 115, and the other set of which are designated at 125 directed inwardly from internal cylindrical wall structure 117. The blades carrying rotor 118 thus operate between the sets of stator blades 124 and 125.

Rotor 118 carries circular rack 126 which meshes with pinion 127 carried in bearing 128 supported from the perforated spider-like front wall structure 129 of the stator casing. Pinion 127 drives gear 130 carried by shaft 131. Gear 130 meshes with gear 132 which is carried by shaft 133 journalled in spider-like support 134 mounted in the forward end of feed cylinder 115. Shaft 133 carries propeller 135 which is positively driven by the rotor 118 while the unit is in transit through the air, thus facilitating the feeding of air through the central feed cylinder 115, and through the perforations 136 in end wall 129, and into the tiers 112 and 114 in succession. The manner of journalling the rotor 118 with respect to the inner feed cylinder 115 and the internal cylindrical wall structure 117 is one of the important details of the structure shown in Fig. 17 and which has been illustrated more particularly in Fig. 21 which is a fragmentary section taken substantially on line 21—21 of Fig. 16, from which it will be noted that the anti-friction bearings, as represented for example at 119, are arranged on spider-like members 118a and 118b, extending from rotor cylinder 118 and which support anti-friction bearings in opposite ends thereof and which engage in raceways disposed respectively in feed cylinder 115 and internal cylindrical wall structure 117. Because of the spider-like construction of the spacing and bearing means between the central feed tube 115 and the internal cylindrical wall structure 117 the inrushing air is fed through the tiers of stator and rotor blades and is compressed while being heated and passes through perforations 136 to the combustion chamber 137 which contains the fuel burners 138. Fuel burners 138 are supplied with liquid or gaseous fuel through conduits 139 from a fuel reservoir mounted externally to stator casing 116. Each of the burners 138 is enclosed by a perforated casing 140 forming an individual combustion chamber about each burner and encloses a flame tube 141 within which the flame from burner 138 operates. The hot gases at high velocity and under high compression are directed into the combustion area 142 where they are mixed with the onrushing air through feed tube 115 as delivered through perforations 143 in feed tube 115 and 144 in rotor 118, whereby the pressure effects are integrated for driving multi-stage turbine blades 145 and 146 carried by rotor 118. The terminus of rotor 118 is provided with an end flange 147 supported in anti-friction bearings in flange 148 extending from feed tube 115. The hot exhaust gases are discharged through the end of the stator casing 116 represented at 149. The flow of the discharge gases is controlled by vanes 150 and 151 journalled at 150a and 151a with respect to stator housing 116, and also by means of the vanes 152 and 153 journalled at 152a and 153a in stator casing 116. It will be understood that four such vanes, for each set of vanes, may be employed in diametrical positions of the casing as hereinbefore explained in connection with the other forms of my invention.

The area designated at 154 adjacent the rear of the feed tube 115 may contain a multiplicity of fuel burners for increasing the temperature at the discharge end of the unit.

The jet discharge end of the unit has been illustrated as employing a circular exit for exhaust gases, but it will be understood that a rectangular aperture may be provided in substitution for the circular aperture.

Figure 19:
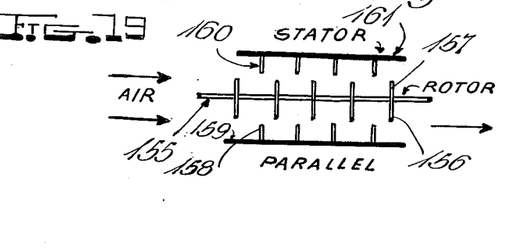
Fig. 19 is a theoretical view showing a parallel arrangement of tier which may be used in the multiple tier construction of Fig. 16.
Figure 20:
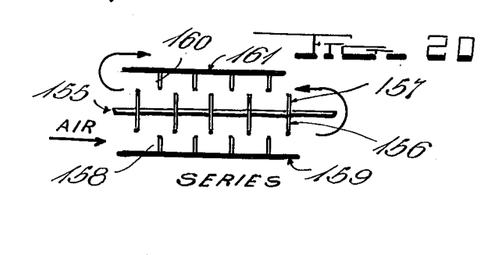
Fig. 20 schematically illustrates a series arrangement of tier which may be employed in the multiple tier construction of Fig. 16.

I have illustrated in Fig. 19 the schematic arrangement for a tier of the compressor arranged for parallel operation in which rotor 155 carries blades 156 extending in one direction and blades 157 extending in the opposite direction and alternately disposed with respect to stator blades 158 carried by stator 159 and stator blades 160 carried by stator 161. The onrushing air travels in parallel paths for integrating pressure effects in parallel for driving the rotor 155. This method of operation may be employed in each tier of the multiple tier coaxial compressor of Figs. 16-18. I may also employ a series drive arrangement in which the onrushing air is confined as shown in Fig. 20 for operation between stator blades 158 and rotor blades 156 in one path. The air is then directed to move in a path between rotor blades 157 and stator blades 160 in a series path. The series arrangement may also be employed for each tier of the multiple tier coaxial compressor.

I have described my invention in certain of its preferred embodiments but I realize that my invention is capable of being carried out by other modified arrangements and I desire that it be understood that no limitations upon my invention are intended other than may be imposed by the scope of the appended claims.

What I claim as new and desire to secure by Letters Patent of the United States, is as follows:

1. A jet propulsion turbine engine comprising a casing enclosing a hollow central tube extending axially of said casing in spaced relation to the inner wall thereof, stator compressor blades carried by a portion of the length of said tube, a co-axial compressor rotor having internal compressor blades coacting with said stator blades and external compressor blades on said rotor, internal stator blades carried by the interior of said casing and coacting with the external compressor blades on said rotor, a turbine rotor surrounding and rotatable on an extension of said tube, the extension of said tube being spaced from the central portion of said tube by a tubular zone which is perforated for the passage of gases and having external blades terminating adjacent the interior of said casing, said turbine rotor operating to drive said co-axial compressor rotor, a ring of burners arranged in said casing concentrically around said stator compressor blades adjacent said turbine rotor, said burners discharging in the direction of the turbine rotor in a space formed in the casing in an annular position around the apertures in said apertured central tube, whereby a plurality of co-axially disposed gaseous flow pressure paths extend from the admission end of said casing to the discharge end thereof.

2. A jet propulsion turbine engine comprising a casing enclosing a hollow central tube extending axially of said casing in spaced relation to the inner wall thereof, stator compressor blades carried by a portion of the length of said tube, a co-axial compressor rotor having internal compressor blades coacting with said stator blades and external compressor blades on said rotor, internal stator blades carried by the interior of said casing and coacting with the external compressor blades on said rotor, a turbine rotor surrounding and rotatable on an extension of said tube, the extension of said tube being spaced from the central portion of said tube by a tubular zone which is perforated for the passage of gases and having external blades terminating adjacent the interior of said casing, said turbine rotor operating to drive said co-axial compressor rotor, a ring of burners arranged in said casing concentrically around said stator compressor blades adjacent said turbine rotor, said burners discharging in the direction of the turbine rotor in a space formed in the casing in an annular position around the apertures in said apertured central tube, whereby a plurality of co-axially disposed gaseous flow pressure paths extend from the admission end of said casing to the discharge end thereof, and a plurality of adjustable vanes pivotally mounted within said casing adjacent the discharge end of said tube and the exhaust end of said rotor for regulating the discharge from all of said gaseous flow paths.

3. A jet propulsion turbine engine comprising a casing enclosing a hollow central tube extending axially of said casing in spaced relation to the inner wall thereof, stator compressor blades carried by a portion of the length of said tube, a co-axial compressor rotor having internal compressor blades coacting with said stator blades and external compressor blades on said rotor, internal stator blades carried by the interior of said casing and coacting with the external compressor blades on said rotor, a turbine rotor surrounding and rotatable on an extension of said tube, said turbine rotor operating to drive said co-axial compressor rotor, a ring of burners arranged in said casing concentrically around said stator compressor blades adjacent said turbine rotor, said burners discharging in the direction of the turbine rotor in a space formed in the casing in an annular position around said central tube, whereby a plurality of co-axially disposed gaseous flow pressure paths extend from the admission end of said casing to the discharge end thereof, and a plurality of coacting adjustable streamlined vanes pivotally mounted adjacent the discharge end of said tube and movable between two limits for controlling the ratio of discharge area across the discharge end of said turbine rotor and the discharge end of said tube.

References Cited in the file of this patent

UNITED STATES PATENTS

| Number | Name | Date |
|---|---|---|
| 2,396,911 | Anxionnaz et al. | Mar. 19, 1946 |
| 2,405,723 | Way | Aug. 13, 1946 |
| 2,416,389 | Heppner et al. | Feb. 25, 1947 |
| 2,430,399 | Heppner | Nov. 4, 1947 |
| 2,455,458 | Whittle | Dec. 7, 1948 |
| 2,464,724 | Sédille | Mar. 15, 1949 |
| 2,505,660 | Baumann | Apr. 25, 1950 |
| 2,570,591 | Price | Oct. 9, 1951 |

FOREIGN PATENTS

| Number | Country | Date |
|---|---|---|
| 586,572 | Great Britain | Mar. 24, 1947 |